(12) United States Patent
Chang

(10) Patent No.: US 12,455,025 B2
(45) Date of Patent: Oct. 28, 2025

(54) QUICK INSTALLATION PIPE COUPLING WITH SUPPORTING BARRIER RING

(71) Applicant: Aalberts Integrated Piping Systems APAC Inc., Wandan (TW)

(72) Inventor: Bob Chang, Wandan (TW)

(73) Assignee: Aalberts Integrated Piping Systems APAC Inc., Pingtun (TW)

( * ) Notice: Subject to any disclaimer, the term of this patent is extended or adjusted under 35 U.S.C. 154(b) by 0 days.

(21) Appl. No.: 18/291,614

(22) PCT Filed: Jul. 28, 2022

(86) PCT No.: PCT/IB2022/056987
§ 371 (c)(1),
(2) Date: Jan. 24, 2024

(87) PCT Pub. No.: WO2023/007419
PCT Pub. Date: Feb. 2, 2023

(65) Prior Publication Data
US 2024/0410504 A1    Dec. 12, 2024

(30) Foreign Application Priority Data

Jul. 28, 2021 (NL) ...................................... 2028870

(51) Int. Cl.
*F16L 17/04*  (2006.01)
*F16L 21/06*  (2006.01)
*F16L 23/08*  (2006.01)

(52) U.S. Cl.
CPC ............... *F16L 17/04* (2013.01); *F16L 23/08* (2013.01); *F16L 21/065* (2013.01)

(58) Field of Classification Search
CPC ......... F16L 23/08; F16L 23/04; F16L 21/065; F16L 17/04
See application file for complete search history.

(56) References Cited

U.S. PATENT DOCUMENTS

| | | | |
|---|---|---|---|
| 2,362,454 A * | 11/1944 | Nelle | F16L 23/04 |
| 2,377,510 A | 6/1945 | Newell | |
| 3,134,612 A | 5/1964 | Glasgow | |
| 3,977,705 A | 8/1976 | Thiessen et al. | |
| 4,861,075 A * | 8/1989 | Pepi | F16L 17/04 |
| 7,722,092 B2 * | 5/2010 | Kim | |
| 8,038,176 B2 * | 10/2011 | Bowman | F16L 17/04 |
| 8,646,165 B2 | 2/2014 | Gibb et al. | |

(Continued)

FOREIGN PATENT DOCUMENTS

DE              367004 C        1/1923

*Primary Examiner* — William S. Choi
(74) *Attorney, Agent, or Firm* — Hoffmann & Baron, LLP

(57) ABSTRACT

A quick installation pipe coupling includes a supporting barrier ring that is located between a gasket and a bottom wall of an annular channel that is defined by housing segments in between arcuate engaging shoulders thereof. The supporting barrier ring extends as a protective barrier circumferentially around an outer surface of the gasket, and is dimensioned and configured to support the housing segments spaced-apart in a pre-assembled ready for installation state of the coupling with their arcuate engaging shoulders delimiting insertion openings towards the central space that are larger than cross-sectional dimensions of the pipe ends before tightening of connection members.

14 Claims, 16 Drawing Sheets

(56) References Cited

U.S. PATENT DOCUMENTS

| | | |
|---|---|---|
| 8,819,914 B2 | 9/2014 | Porter et al. |
| 9,958,095 B2 | 5/2018 | Blease et al. |
| 2009/0189392 A1* | 7/2009 | Ignaczak ............... F16L 21/065 |
| 2015/0204473 A1* | 7/2015 | Svetlik ................... F16L 23/08 |

* cited by examiner

Fig. 5a
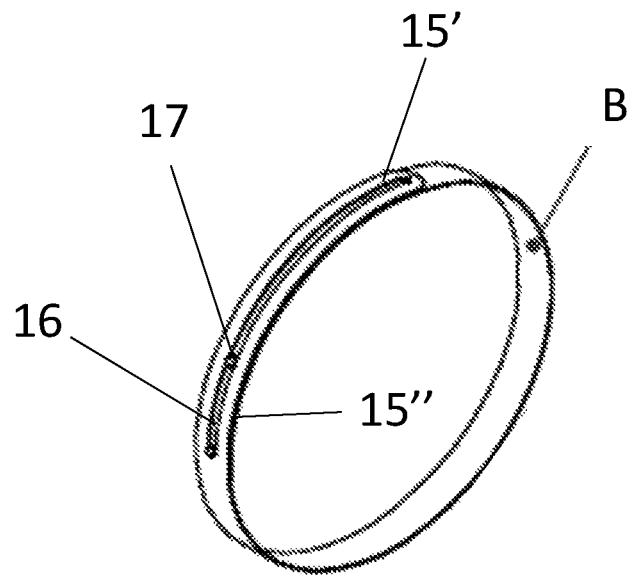
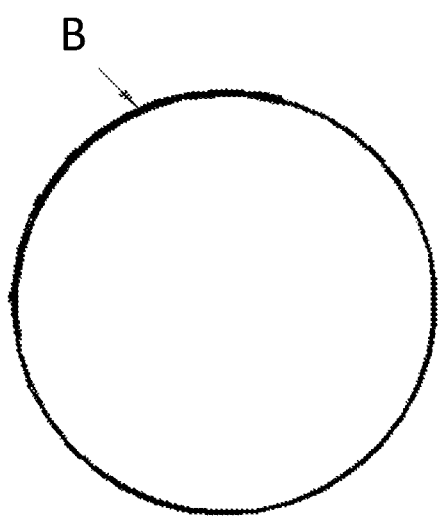
Fig. 5b
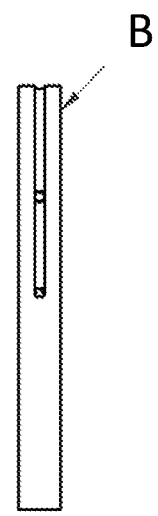
Fig. 5c

Fig. 6a
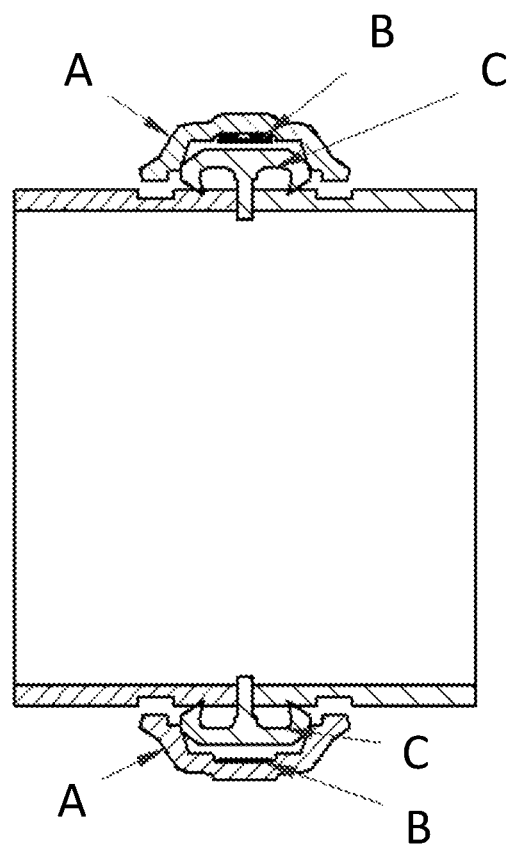
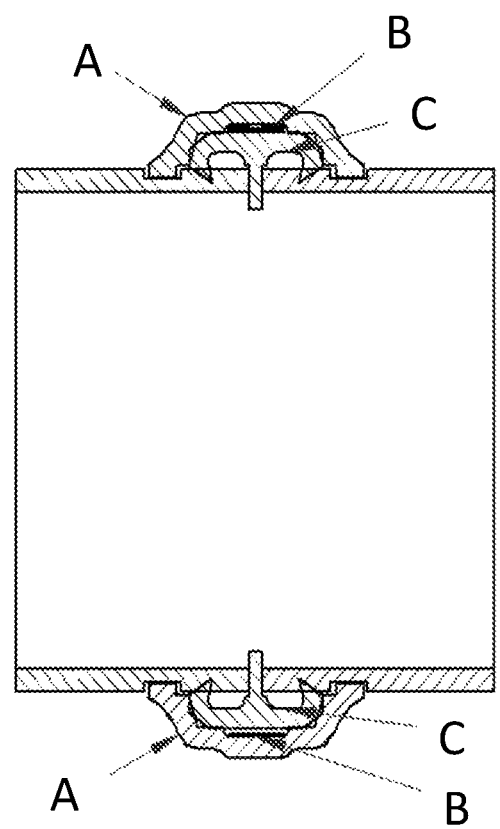
Fig. 6b

Fig. 7a
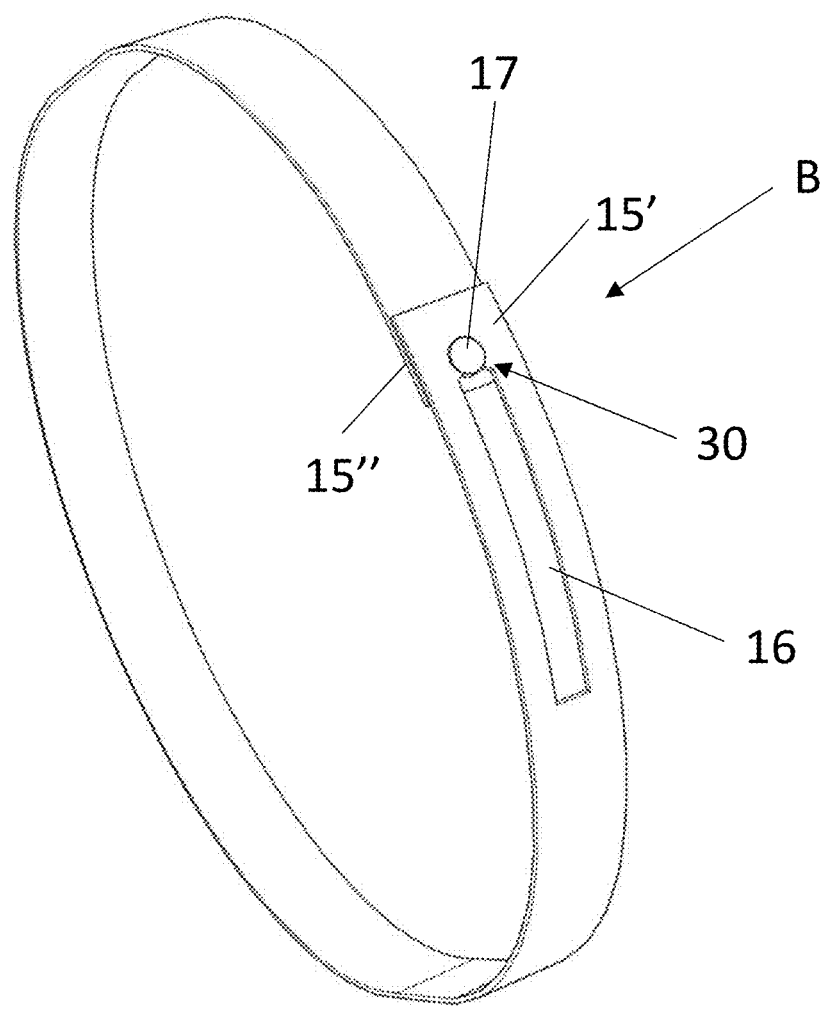
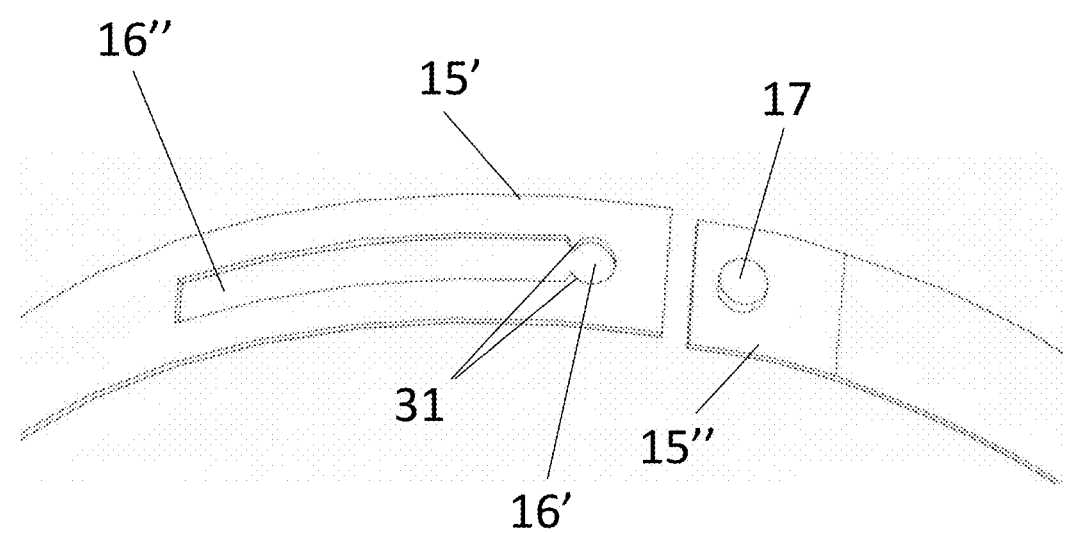
Fig. 7b

Fig. 8a
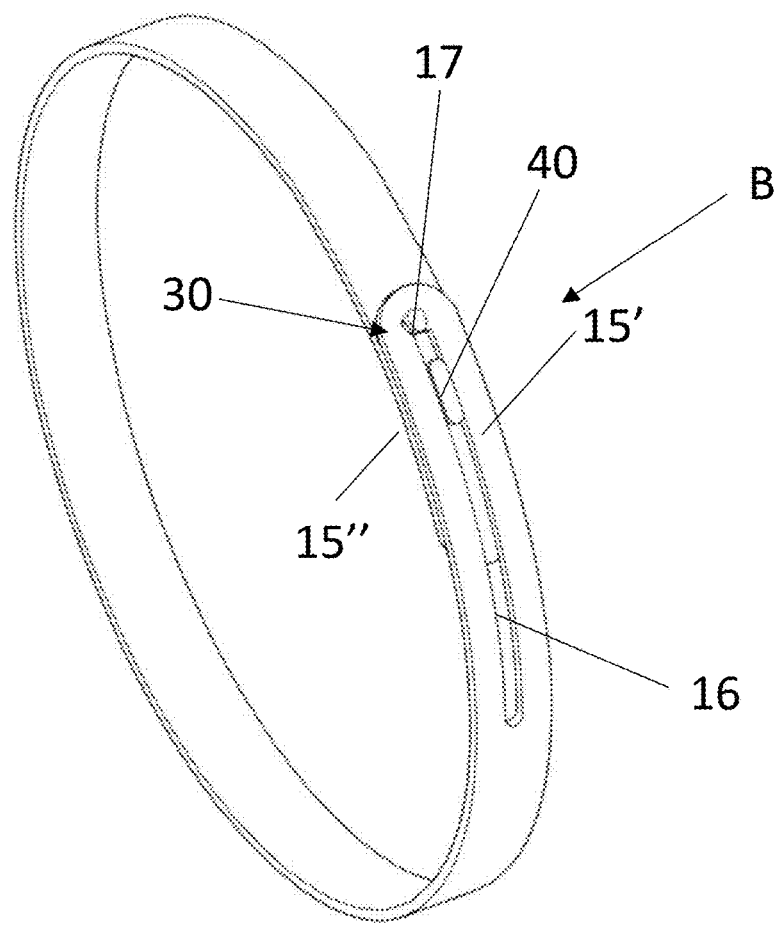
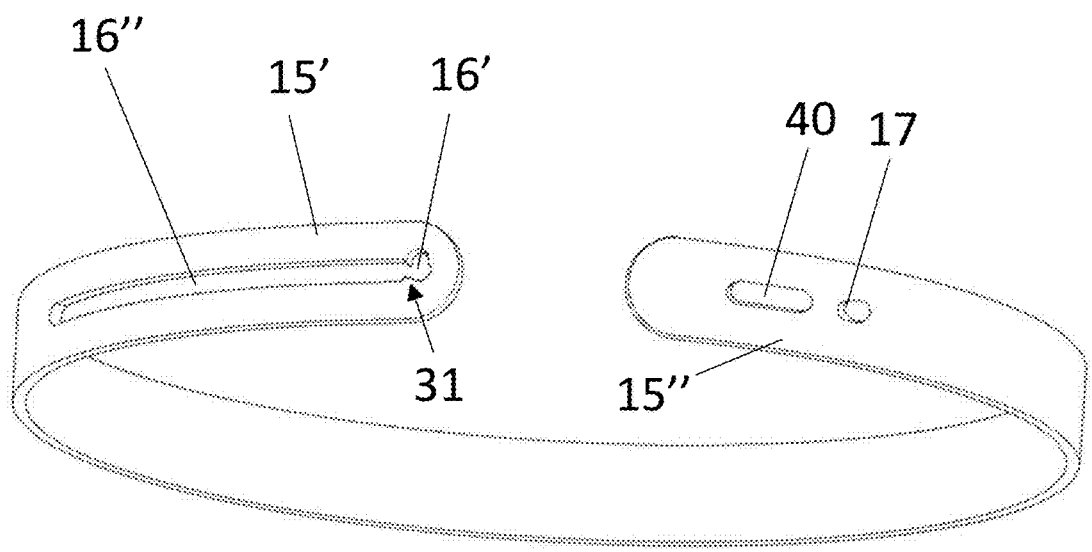
Fig. 8b

Fig. 10a
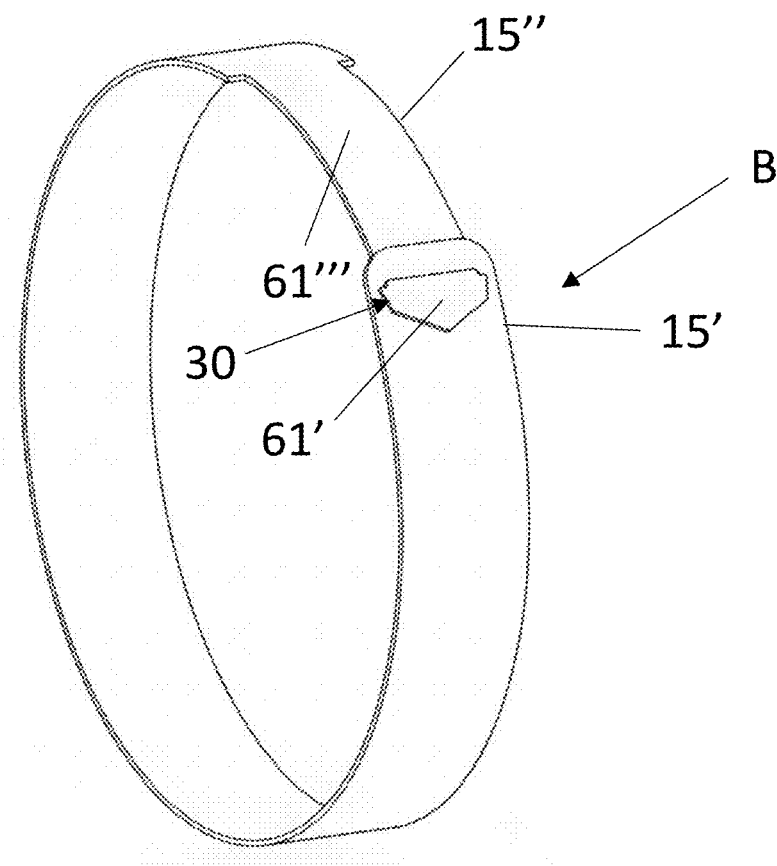
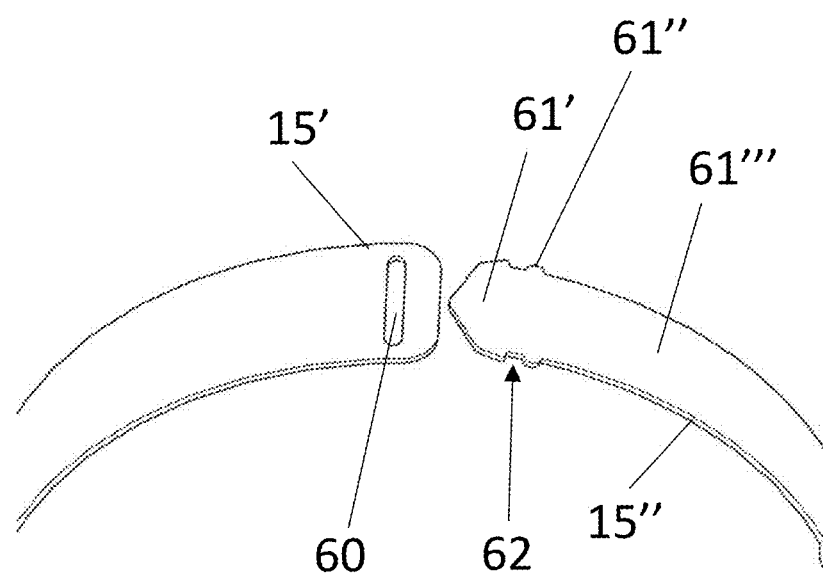
Fig. 10b

Fig. 11
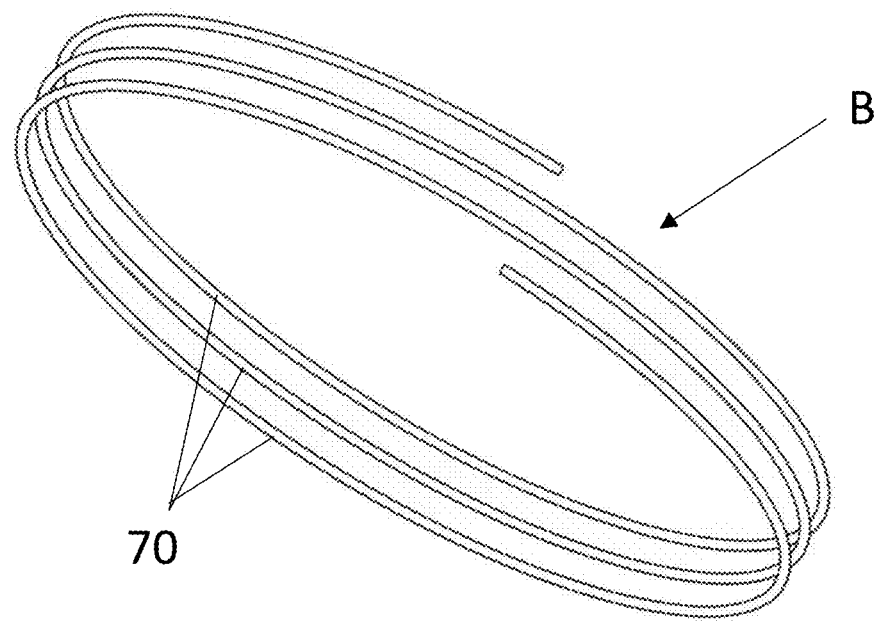
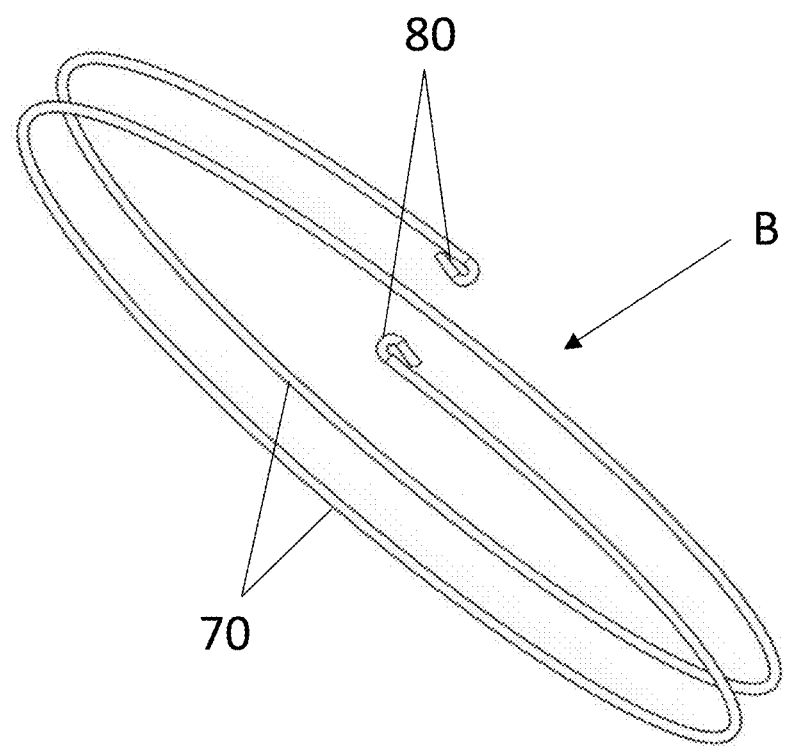
Fig. 12

QUICK INSTALLATION PIPE COUPLING WITH SUPPORTING BARRIER RING

CROSS-REFERENCE TO RELATED APPLICATIONS

This application is the National Stage of International Application No. PCT/IB2022/056987, filed Jul. 28, 2022, which claims the benefit of Netherlands Application No. 2028870, filed Jul. 28, 2021, the contents of which is incorporated by reference herein.

FIELD OF THE INVENTION

The invention relates to a quick installation pipe coupling, in particular to a quick installation grooved pipe coupling, for creating a sealed connection between pipe ends.

BACKGROUND TO THE INVENTION

Grooved pipe couplings are commonly used in industry due to their low labour requirements, speed of installation, reliability, and their ability to be removed.

Grooved pipe couplings are widely used for axially joining two pipe ends together in such a way as to create a liquid tight union between the pipe ends. Common practice in the grooved coupling industry is to join pipe ends using two or more arcuate housing segments that get fastened around the pipe ends to form a generally ring-like coupling housing. Typically, a pair of generally semi-circular housing segments are used, which are fastened together, often bolted together. The housing segments are substantially U- or C-shaped in longitudinal (axial) cross-section to provide room for a gasket. Inwardly projecting peripheral edges of the housing segments, referred to as engaging shoulders, are shaped with keys for interlocking within circumferential grooves now commonly provided in the pipe ends. The engagement of the key and groove limit axial movement of the pipe ends and prevent them from separating. The coupling housing also limits angular deflection allowed between the two opposing pipe ends.

The coupling is typically secured as bolts are tightened through bolt holes until the keys engage the circumferential grooves on the pipe ends, thus fastening the pipe ends together. Where the housing segments meet around the circumference of the pipe ends, a mating structure is often used to lock one housing half to the other end to add stability. A rubber gasket, also frequently U- or C-shaped in longitudinal (axial) cross-section, is typically arranged within the coupling in a gasket pocket formed by the U- or C-shaped longitudinal cross-section of the coupling housing, such that when the housing segments are tightened against the pipe ends, inner peripheral edges of the gasket are sealed against the pipe ends.

Traditionally, such pipe couplings are typically shipped as multi-part assembled pipe coupling, which then must be disassembled and then all components re-assembled on site, and in situ, typically overhead and in hard to reach places.

In order to reduce installation time and labour cost, for example, U.S. Pat. No. 2,377,510 already showed a grooved pipe coupling with two semi-circular metal housing segments that at one end are connected to each other by means of a hinge and at the other end by means of a tightenable bolt, for which it is foreseen that the parts of the pipe coupling will be pre-assembled ready for installation, thereby assuring that the parts will be and remain in proper relation for immediate application to the meeting pipe ends. It is only necessary to place the coupling around the pipe ends and tighten the bolt and a perfectly sealed coupling of the pipe ends is insured.

In this pre-assembled ready for installation state, the housing segments already surround, enclose and lie against an outer surface of a gasket, the bolt already extends through two radially outwardly projecting lugs of the housing segments, and a nut may already be screwed onto the bolt.

In this pre-assembled ready for installation state, the pipe coupling can be placed over the pipe ends without having to be being hindered by the engaging shoulders. For that, the gasket has inwardly projecting lips of which the inner peripheral edges, in this pre-assembled ready for installation state, are dimensioned with an inner radius that is smaller than an inner radius of the engaging shoulders. The inner peripheral edges of the inwardly projecting lips of the gasket in this pre-assembled ready for installation state are furthermore dimensioned with an inner radius that is smaller than outsides of the pipe ends, so that when the pipe coupling is placed over the pipe ends, an initial seal is obtained.

A disadvantage here is that the gasket is permanently connected to the housing segments, and is of a split type that has ears at its ends that need to get pressed sealing against each other between the lugs of the housing segments. This makes the construction more complex and vulnerable to leakage.

U.S. Pat. No. 3,977,705 shows an example of a grooved pipe coupling for coupling a smaller and larger pipe end with each other. Here a circumferentially closed ring-shaped gasket is used. This gasket also has inwardly projecting lips of which the inner peripheral edges in this pre-assembled ready for installation state are dimensioned with inner radii that are smaller than inner radii of engaging shoulders of its semi-circular housing segments. The inner peripheral edges of the inwardly projecting lips of the gasket in this pre-assembled ready for installation state are furthermore dimensioned with inner radii that are smaller than outsides of the respective smaller and larger pipe ends, so that when the pipe coupling is placed over the pipe ends, an initial seal is obtained. Thus also, pipe ends can be inserted in between them in a pre-assembled state of the coupling.

A disadvantage hereof is that nuts on bolts that connect the housing segments with each other need to be such loose that they offer enough play for the housing segments to move away from each other during insertion of the pipe ends. This makes the pipe coupling difficult to handle in such a 'loose' pre-assembled ready for installation state. Furthermore, the pipe ends during their insertion, then not only would need to push and deform the lips of the gasket axially inward, but at a same time also would need to stretch the gasket towards a larger diameter while pushing the housing segments away from each other.

U.S. Pat. No. 3,134,612 shows a grooved pipe coupling of which the gasket is dimensioned with such an oversized tapering outer surface shape relative to the housing segments' substantially U- or C-shaped longitudinal (axial) cross-section, that the housing segments in a pre-assembled state of the coupling can already be kept in a sufficiently spaced apart relationship for pipe ends to be inserted in between them.

A disadvantage hereof is that upon a subsequent tightening of the bolts, the gasket needs to be deformed in order to be able to fit inside the substantially U- or C-shaped longitudinal (axial) cross-section of the housing segments. This may result in non-uniform and therefore unpredictable deformation behaviour of the gasket.

A number of other examples of quick installation pipe couplings are shown in U.S. Pat. No. 8,646,165.

In a first embodiment it is foreseen here to use housing segments that in a pre-assembled ready for installation state have radii of curvature that are greater than radii of curvature of outer surfaces of pipe ends, and to have those housing segments deformed upon tightening of bolts so as to conform the curvature of their arcuate engaging shoulders to the outer surfaces of the pipe ends.

A disadvantage hereof is that a bending stiffness of the housing segments need to be accurately tuned, which is rather difficult, in particular for cast iron housing segments, which then even might crack. Also it requires substantial additional tightening force on the bolts.

In a second embodiment it is foreseen here to use a gasket that is sized to position and support the housing segments in such spaced apart relationship on an outer surface of the gasket so as to allow insertion of pipe ends into the pre-assembled pipe coupling without being hindered by the engaging shoulders thereof.

A disadvantage hereof is that in the preassembled state, the housing segments are loading the oversized gasket, which might lead to undesired pre-deformation of the gasket. For this it is necessary to make the gasket rather stiff which may negatively influence its sealing behaviour. Also this requires relative large deformation of the gasket during the entire moving of the housing segments together far enough to overcome a large part of their initial spacing. This requires relative high tightening forces on the bolts. Furthermore, this requires the gasket to substantially reduce its diameter without being able to escape radially outwards or axially sideways. This may even cause the gasket to buckle at non-foreseen places which might lead to leakages starting to occur during use in the connected state.

In a third embodiment it is foreseen to use collapsible, removable or elastically deformable type spacers between the lugs of the housing segments to maintain them in spaced apart relation in the pre-assembled ready for installation state.

A disadvantage hereof is that the spacers require relative high tightening forces on the bolts. The collapsible type spacers furthermore may break in several parts and thus may leave behind sharp loose particles. The removable type spacers furthermore require additional actions in that they need to be taken away. This is not always easily possible at difficult to reach places. Also, this might sometimes be forgotten, and leads to the removed spacers needing to be thrown away.

For all three embodiments it furthermore goes that large spacings need to be present at transitions between lugs of the housing segments in order to make its quick installation from out of the pre-assembled ready for installation state possible. Those large spacings however entail the risk of the gasket getting damaged or starting to extrude to the outside at those large spacings at the transitions between the lugs of the housing segments. Such damaging or extruding of gasket material deteriorates a proper sealing function of the pipe coupling, and may not only occur during tightening of the bolts and subsequent deformation or moving of the housing segments towards each other, but also over time, for example all of a sudden long after the connection has been made.

BRIEF DESCRIPTION OF THE INVENTION

The present invention aims to overcome those disadvantages at least partly or to provide a usable alternative. In particular the present invention aims to provide a user-friendly, cost effective, reliable quick installation pipe coupling that is made available to crafts persons in a further improved pre-assembled ready for installation state.

According to the present invention this aim is achieved by a quick installation pipe coupling configured for connecting pipe ends, in particular two grooved pipe ends. The coupling comprises a plurality of housing segments, each housing segment comprising radially inwardly projecting arcuate engaging shoulders that are configured for engaging pipe ends, in particular into circumferential grooves that extend around said pipe ends, one or more tightenable connection members for connecting the housing segments with each other while surrounding a central space for insertion of said pipe ends, and a gasket that is received into an annular channel that is defined by the housing segments in between the arcuate engaging shoulders and that is configured to engage sealing on said pipe ends, in particular upon tightening of the one or more connection members. According to the inventive thought the coupling further comprises a supporting barrier ring that is located between the gasket and a bottom wall of the annular channel that is defined by the housing segments in between the arcuate engaging shoulders, wherein the supporting barrier ring extends as a protective barrier circumferentially around an outer surface of the gasket, and wherein the supporting barrier ring is dimensioned and configured to support the housing segments spaced-apart in a pre-assembled ready for installation state with their arcuate engaging shoulders delimiting insertion openings towards the central space that are larger than cross-sectional dimensions of said pipe ends before tightening of the one or more connection. members.

The provision of the supporting barrier ring offers a number of important advantages, not only during installation, but also during pre-assembly as well as during actual use after the pipe ends have been connected with each other and are used for transportation of liquid or gaseous media there through. During installation the supporting barrier ring keeps the housing segments initially spaced from each other, while at a same time it forms a protective and fall-back barrier around the gasket. With initially it is meant the pre-assembled ready for installation state, including during transportation and storage. In this pre-assembled ready for installation state the coupling can easily and quickly be placed over one of the pipe ends, whereas the other pipe end can be inserted into the coupling. During all these starting stages of installation, the supporting barrier ring can keep the housing segments spaced from each other. Subsequently, during a final stage of installation, the connection members can be tightened while forcing the housing segments to move towards each other until their engaging shoulders have fully engaged the pipe ends. During this final stage of installation, the supporting barrier ring forms a protective barrier against the gasket getting damaged or extruding outwards at transitions between the housing segments. Also it is well able to prevent that gasket material gets pinched in between lugs or the like of the housing segments or gets cut open by rotating threads of the connection members or the like during tightening of those connection members. After installation has been completed, the supporting barrier ring may form an additional barrier itself against leakage when the gasket gets damaged due to fire or the like. Thus the supporting barrier ring helps to increase and maintain a proper sealing function of the pipe coupling, not only during tightening of the connection members and subsequent moving of the housing segments towards each other, but also over time, in particular also long after the connection has been made.

Advantageously, during pre-assembly, the housing segments can easily be placed in correct opposing positions onto the supporting barrier ring. Since the supporting barrier ring does not have to perform a main sealing function like the gasket, it can be made more stiff and rigid than the gasket.

The housing segments then already lie relative stable, that is to say with the bottom walls of their annular channel portions lying against the outer surface of the supporting barrier ring, and with their engaging shoulders delimiting the supporting barrier ring axially sideways. A pre-tightening of the connection members then further stabilizes the pre-assembly of the supporting barrier ring and housing segments. In this already stable position, the gasket can easily be placed via the central space inside the annular channel. In the alternative it is of course also possible to, during such pre-assembly, first place the supporting barrier ring around the gasket, and then place the housing segments around them and pre-tighten the connection members. In both situations, the supporting barrier ring can be dimensioned with such large initial radial dimensions that the housing segments are kept sufficiently spaced apart from each other such that the engaging shoulders lie at a radius that is larger than the radius of the outer surfaces of the pipe ends. Thus, a truly reliable quick installation pipe coupling is provided that is available for installation in a pre-assembled ready for installation state in which the housing segments together with the supporting barrier ring safely surround and enclose the gasket, and do not lie with their entire weight or otherwise loaded against the gasket. Owing to this the gasket does not get pre-deformed, and the entire pre-assembly in this 'rigid/stable' ready for installation state is easy to handle, and if necessary can even be installed single-handed.

The gasket can be a circumferentially closed ring-shaped sealing ring. Since the gasket no longer has to play a role in moving the housing segments away from each other during installation and/or in keeping the housing segments spaced from each other in the pre-assembled state, this gives a lot of freedom with respect to the design and choice of material for the gasket. This makes it possible to save material on the gasket, and/or optimize it to perform its aimed sealing function. Upon tightening of the bolts, the gasket only needs to be pushed sealing against the pipe ends. A relative large deformation of the gasket during the entire radial inward moving of the housing segments, advantageously is not necessary. This helps to obtain uniform and predictable deformation behaviour of the gasket during tightening of the connection members, and prevent buckling thereof.

Advantageously, the housing segments only need to overcome their initial spacing by getting forced to displace radially towards the pipe ends until the engaging shoulders engage upon the pipe ends. A deformation of the housing segments is not necessary for that. This is particularly important and advantageous when the housing segments are made out cast metal, like cast iron, bronzes and steels. Furthermore, this makes it possible to locally strengthen them if desired, and/or optimize them to perform their engaging function.

In a preferred embodiment, the supporting barrier ring can be of a split type and has circumferentially overlapping end portions in the pre-assembled ready for installation state that are configured to increase their overlap upon tightening of the one or more connection members.

Thus advantageously, the split supporting barrier ring is well able to allow the housing segments to move towards each other upon tightening of the connection members while forcing the supporting barrier ring to reduce size by having its end portions sliding over each other towards larger overlaps.

In addition thereto, complementary male and female parts can be provided on the respective overlapping end portions of the supporting barrier ring, wherein the female part extends in the circumferential direction along its respective overlapping end portion, and wherein the male part is movably guided in the circumferential direction along the female part.

Thus advantageously, the supporting barrier ring although being of a split type is axially stable. The overlapping end portions are unable to slide sideways away from each other. This is advantageous during pre-assembly when the opposing housing segments are placed upon it, as well as during installation when it is forced to reduce its diameter. Front 'sharp' corner edges of the end portions then cannot all of a sudden get 'hooked' behind inner walls of the engaging shoulders and thus get stuck inside the housing segments, but remain sliding properly within the borders of the side edges and smoothly over the other one of the overlapping end portions of the supporting barrier ring.

In addition thereto or in the alternative, the overlapping end portions of the supporting barrier ring can be provided with temporary locking means that are configured for temporary locking the supporting barrier ring in the pre-assembled non-tensioned state.

Thus advantageously, the supporting barrier ring can reliably be kept exactly at its aimed dimensioned size to support the housing segments at exactly their aimed spaced-apart position in the pre-assembled ready for installation state, that is to say with their arcuate engaging shoulders delimiting insertion openings towards the central space that are larger than cross-sectional dimensions of pipe ends that are to be inserted into that central space. There is no risk of the overlapping end portions starting to prematurely start sliding over each other. Furthermore, this makes it easy to place the gasket inside the locked supporting barrier ring, or to place the locked supporting barrier ring around the gasket, during pre-assembly.

In addition thereto, the temporary locking means can be configured to automatically unlock when a tightening of the one or more connection members reduces the initial spacing between the housing segments and thus forces the end portions of the supporting barrier ring to increase their overlap.

Thus advantageously, the only thing that is necessary to unlock the supporting barrier ring, is to gradually increase the tightening force of the connection elements until it reaches a certain threshold value that is large enough for the locking means to unlock.

In addition thereto, the female part can be a slit or groove and the male part can be a pin that projects into or through the slit or groove, wherein the slit or groove comprises a narrowing that is configured to form the temporary locking means. The narrowing can be dimensioned and configured to only let the pin pass by the narrowing towards a sliding section of the slit, when the tightening of the one or more connection members aims to reduce the spacing between the housing segments, and with that starts to exert a strong enough force onto the end portions of the supporting barrier ring to increase their overlap.

Thus advantageously a fully integrated mechanical solution that does not require breaking or tearing, is provided for forming the locking means.

In a preferred further or alternative embodiment, the supporting barrier ring extends freely with a play around the gasket in the pre-assembled ready for installation state. For that an outer surface of the gasket may have a smaller diameter, in particular at least a few mm smaller, than an inner surface of the supporting barrier ring in the pre-assembled ready for installation state.

Both these measures help to guarantee that the gasket remains fully unloaded during the pre-assembly, and that the overlapping end portions of the supporting barrier ring at least during a first part of installation, when the housing segments are forced to move towards each other due to tightening of the connection members, are entirely free to start sliding along only each other, and not have to immediately also start sliding over the gasket respectively along the bottom wall of the housing segments at a same time.

In a preferred further or alternative embodiment, the supporting barrier ring can be made out of metal material.

This advantageously helps to make the supporting barrier ring strong enough to maintain its initial shape and size in the pre-assembled ready for installation state. Furthermore, it makes the supporting barrier ring fire resistant as well as resistant against aggressive media that may get transported through the pipes after installation. This in turn helps to guarantee that the supporting barrier ring is able to perform a back-up barrier function in case the gasket has burnt away under influence of fire or the aggressive media.

In an alternative embodiment, the supporting barrier ring can be made out of plastic material.

This advantageously may help to make the supporting barrier ring lightweight, cost-effective and non-corrosive. Also, it may help to give the supporting barrier ring a smooth surface and/or low-friction surface for easy mating and operation.

In a preferred further or alternative embodiment, the supporting barrier ring can be made out of a strip of sheet material.

Thus advantageously, it is economic to manufacture, and also helps the overlapping end portions to easily slide along each other upon tightening.

In a preferred further or alternative embodiment, the supporting barrier ring may have a width that is smaller than a width of the gasket.

This saves material and has already appeared enough to at least prevent damaging or outwards extruding of the gasket during tightening.

In an alternative embodiment, the supporting barrier ring may have a width that is equal to or larger than a width of the gasket.

This helps to securely prevent damaging or outwards extruding of the gasket during tightening.

Further preferred embodiments of the invention are described herein.

The invention also relates to a method for quick installing the quick installation pipe coupling according to the present invention.

BRIEF DESCRIPTION OF THE DRAWINGS

The invention shall now be explained in more detail below by means of describing some exemplary embodiments in a non-limiting way with reference to the accompanying drawings, in which:

FIGS. 5a, 5b and 5c show perspective, front and side views of the supporting barrier ring in its tightened state;

FIGS. 6a and 6b show cross-sectional views of the pre-assembled ready for installation state of the coupling with two pipe-ends inserted therein and the subsequent tightened state with the coupling keeping the two pipe ends sealed together;

FIG. 7a shows a first variant of the supporting barrier ring with locking means, in an initially locked position in its pre-assembled ready for installation state;

FIG. 7b shows an enlarged partial view of FIG. 7a showing the end portions in an open position before pre-assembly;

FIG. 8a shows a second variant of the supporting barrier ring with locking means and guiding shoe, in an initially locked position in its pre-assembled ready for installation state;

FIG. 8b shows an enlarged partial view of FIG. 8a showing the end portions in an open position before pre-assembly;

FIG. 10a shows a fourth variant of the supporting barrier ring with tongue-mouth-type locking means, in an initially locked position in its pre-assembled ready for installation state;

FIG. 10b shows an enlarged partial view of FIG. 10a showing the end portions in an open position before pre-assembly;

FIG. 11 shows a fifth variant of the supporting barrier ring with a plurality of adjacent spiral spring windings in its pre-assembled ready for installation state;

FIG. 12 shows a sixth variant of the supporting barrier ring with a plurality of spiral spring windings having backwards bent rounded outer ends in its pre-assembled ready for installation state;

DETAILED DESCRIPTION OF THE INVENTION

Figure 1A:
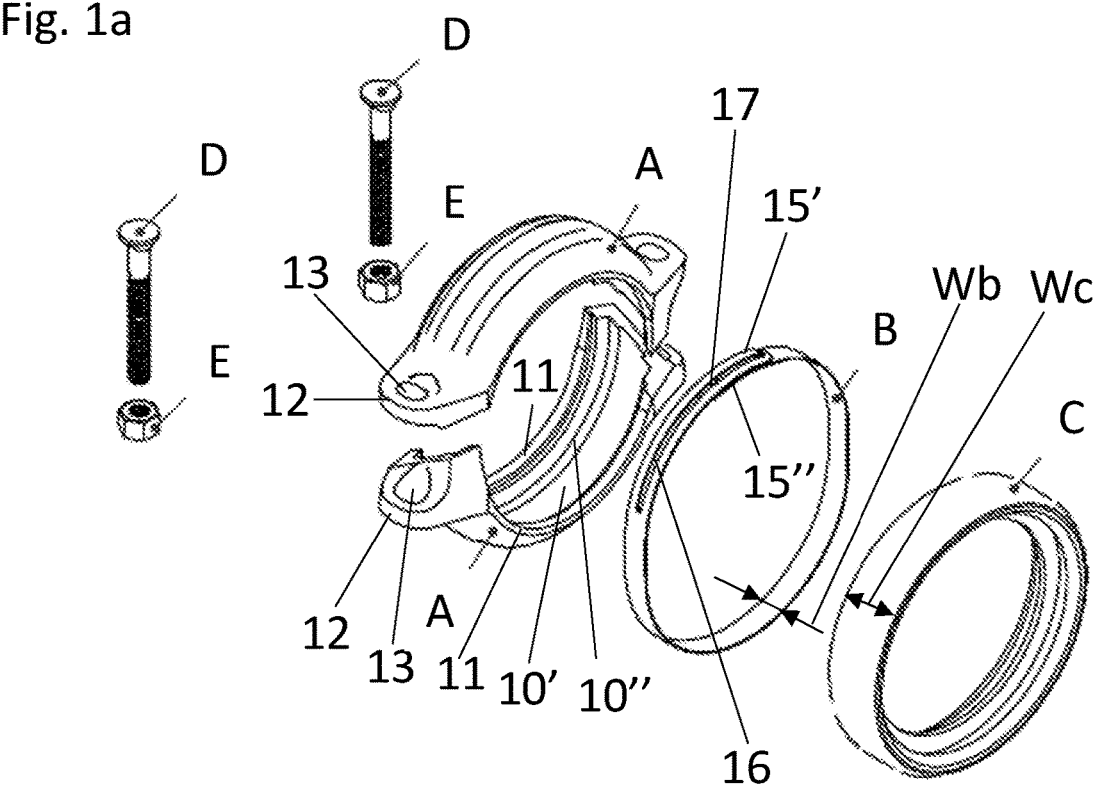
FIGS. 1a and 1b show perspective and side views of the individual components needed for manufacturing a preferred embodiment of the quick installation pipe coupling according to the invention.
Figure 1B:
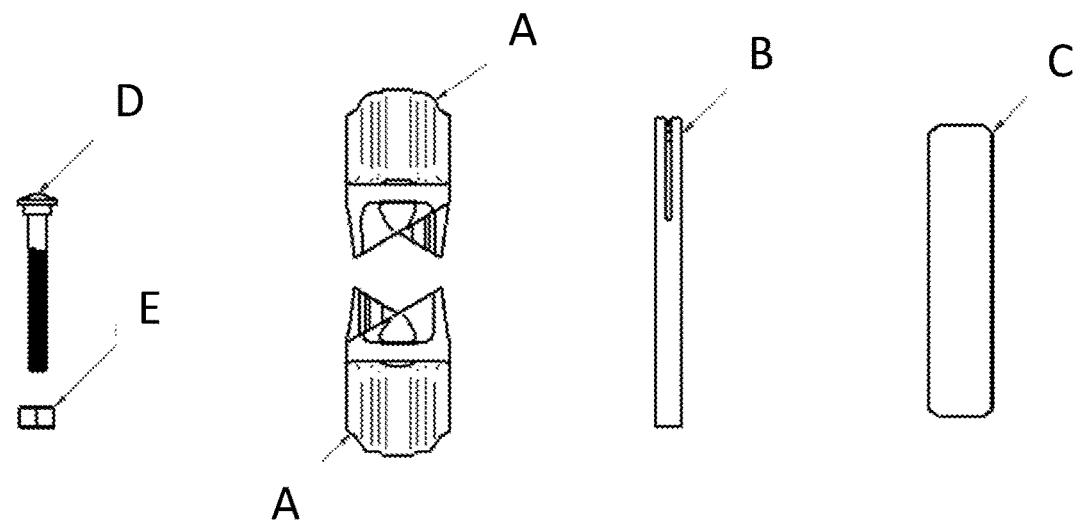

In FIG. 1a-b an exploded view of the pipe coupling is shown. The coupling comprises two semi-circular housing segments that are indicated with the reference sign A. The two housing segments A are identical and symmetric. Each housing segment A defines an inwardly open semi-circular channel 10 with a deepest middle portion 10' and less deep side portions 10", and thus a stepped bottom wall. Furthermore, each housing segment A comprises left and right radially inwardly projecting semi-circular engaging shoulders 11 for engaging into circumferential grooves that extend around pipe ends (not shown). Further, each housing segment A at its free ends is provided with integrally formed radially outwardly projecting lugs 12. Each lug 12 has a throughgoing hole 13 in it that extends in a tangential direction. Furthermore, the opposing free ends of the housing segments A are complementary shaped, here sloping/angled, such that they fit onto or into each other.

The coupling furthermore comprises a split type supporting barrier ring B with circumferentially overlapping end portions 15. The supporting barrier ring B is made out of sheet metal. The radially outer one 15' of the end portions 15 is provided with a female portion 16, here a throughgoing slit, that extends in the circumferential direction along its respective end portion 15'. The radially inner one 15" of the end portions 15 is provided with a male portion 17, here a pin, that extends in the radial direction while projecting with a sliding fit through the female portion 16, here the slit. The male portion 17, here the pin, is movably guided in the circumferential direction along the female portion 16, here the slit, thus offering sideways stability to the overlapping end portions 15 of the supporting barrier ring B.

The coupling furthermore comprises a rubber gasket C for engaging on outer surfaces of pipe ends (not shown) in a sealing manner. The supporting barrier ring B has a width Wb that is smaller than a width Wc of the gasket C.

Finally, the coupling comprises tightenable connection members, here bolts D that can be placed through opposing ones of the lug holes 13, and nuts E that can be screwed onto the threaded bolt ends.

In their unloaded neutral starting positions, that is to say before the parts A-E get pre-assembled, as shown in FIG. 1a-b, the supporting barrier ring B has its overlapping end portions 15 temporarily locked together by means of locking means, that shall be explained later on with reference to FIG. 7. In this temporarily locked state, the supporting barrier ring B has a 'fixedly locked' radius Rb that is a few millimetres larger than the radius Rco of an outer surface of the gasket C. Furthermore, the supporting barrier ring B then has an outer radius Rbo that is larger than the inner radii Rai of the deepest middle portion 10' of the semi-circular channels 10 inside the housing segments A.

Figure 2:
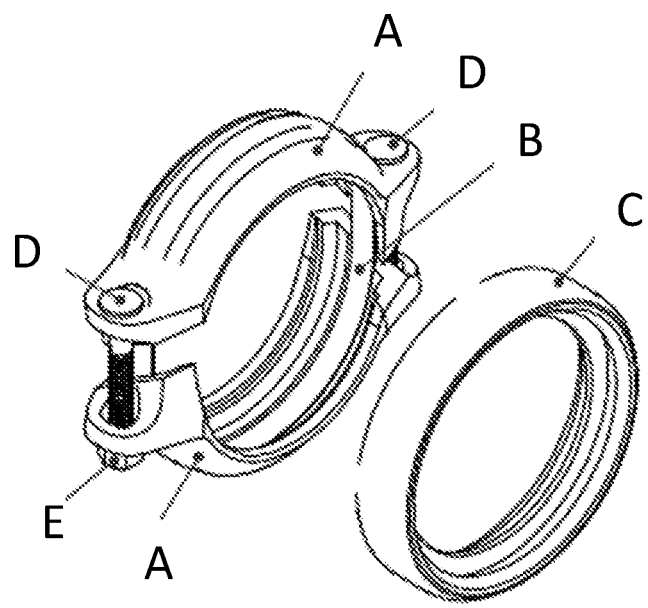
FIG. 2 shows an intermediate step to obtain a pre-assembled ready for installation state.

In FIG. 2 it is shown that the temporarily locked supporting barrier ring B now lies inside the deepest middle portion 10' of the semi-circular channels, while the housing segments A are resting against the temporarily locked supporting barrier ring B, and while the housing segments A are slightly pulled and held together by the bolts D being put in place through the lug holes 13 and the nuts E being screwed onto them. It can be seen in FIG. 1b that the housing segments A in this temporarily locked state of the supporting barrier ring B are kept spaced-apart with spacings of at least a few millimetres between their opposing ones of the lugs 12. This is defined as the pre-assembled ready for installation state for the housing segments A and supporting barrier ring B. In this pre-assembled ready for installation state, the temporary locked supporting barrier ring B is forced by the spaced-apart housing segments A, to take in a somewhat elongate oval or race-track shape. Furthermore, in this pre-assembled ready for installation state, the opposing ones of the engaging shoulders 11 delimit sideways open insertion openings that are larger than cross-sectional dimensions of outer cylindrical surfaces of pipe ends that are aimed to be inserted into and connected together with the coupling. Thus the pipe ends can be inserted into the coupling with bumping against the shoulders 11.

Figure 3A:
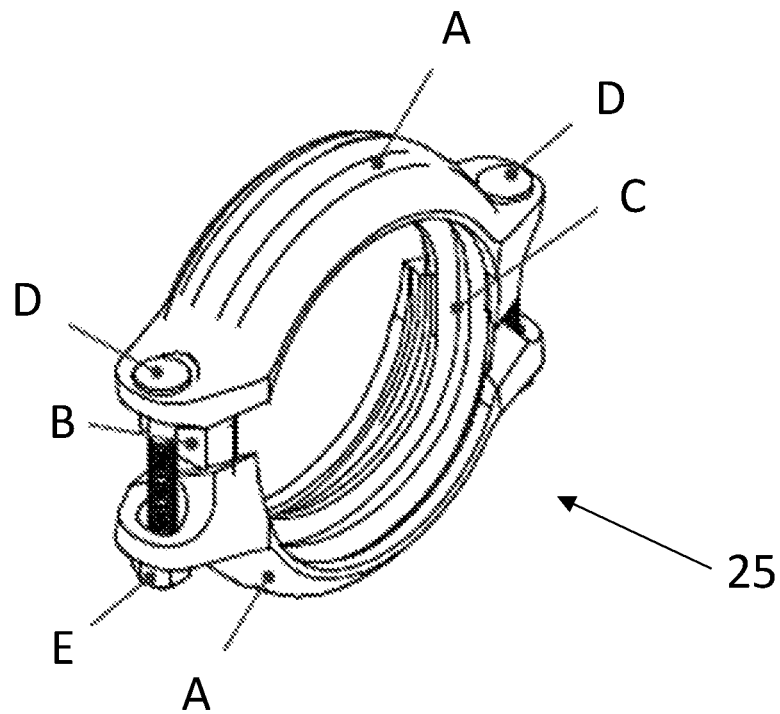
FIGS. 3a and 3b show perspective and cross-sectional views of the pre-assembled ready for installation state.
Figure 3B:
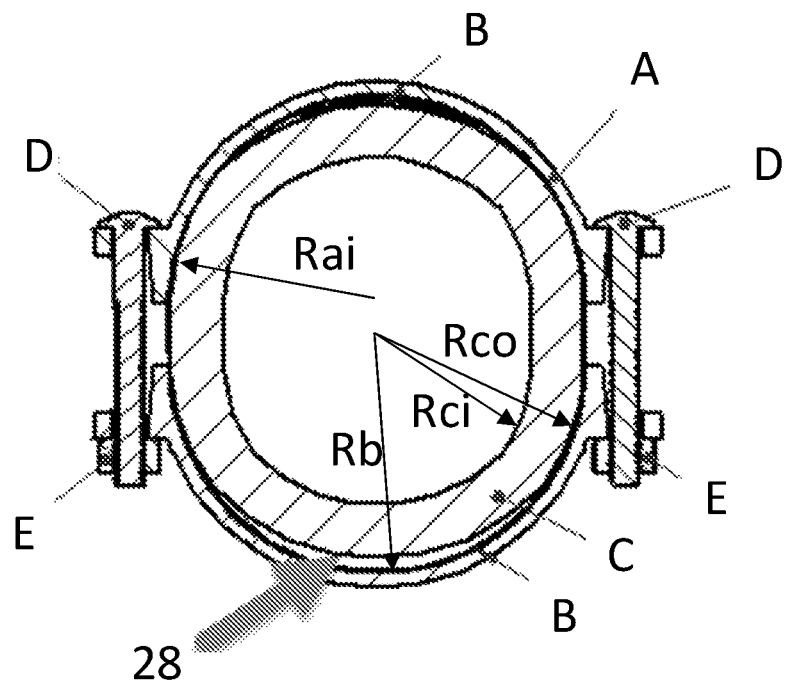

In FIG. 3a-b it is shown that the gasket C is also placed, and lies with a play inside the less deep side portions 10" of the semi-circular channels 10 and also lies with a play inside the supporting barrier ring B that itself lies without play inside the deepest middle portion 10' of the semi-circular housing segments A. Due to the larger dimensioning of the temporarily locked supporting barrier ring B compared to the gasket C, this does not influence the above defined pre-assembled ready for installation state. The opposing ones of the engaging shoulders 11 then also still delimit sideways open insertion openings 25 that are larger than cross-sectional dimensions of pipe ends that are aimed to be connected together with the coupling.

The gasket C is dimensioned with an outer radius Rco that is only slightly larger than the inner radii Rai of the deepest middle portion 10' of the semi-circular channels 10 inside the housing segments A. Thus the gasket C is mainly left free to maintain its circular shape in this pre-assembled ready for installation state of the coupling.

In FIG. 3b it can be seen that due to the larger dimensioning of the temporarily locked supporting barrier ring B compared to the gasket C, plays of a few millimetres are present halfway each semi-circular housing segment A in between the supporting barrier ring B and the gasket C in the pre-assembled ready for installation state. This play is indicated here with an arrow 28, which is substantially equal to the 'fixedly locked' ring radius Rb minus the outer gasket radius Rco.

See also FIG. 6a where a situation is shown in which two pipe-ends have been inserted from opposing sides into the pre-assembled coupling. The inwardly projecting lips of the gasket C already lie somewhat sealing against the inserted pipe ends, whereas the initially locked supporting barrier ring B and the housing segments A resting against it still lie with circumferential play around the inserted pipe ends.

Figure 4A:
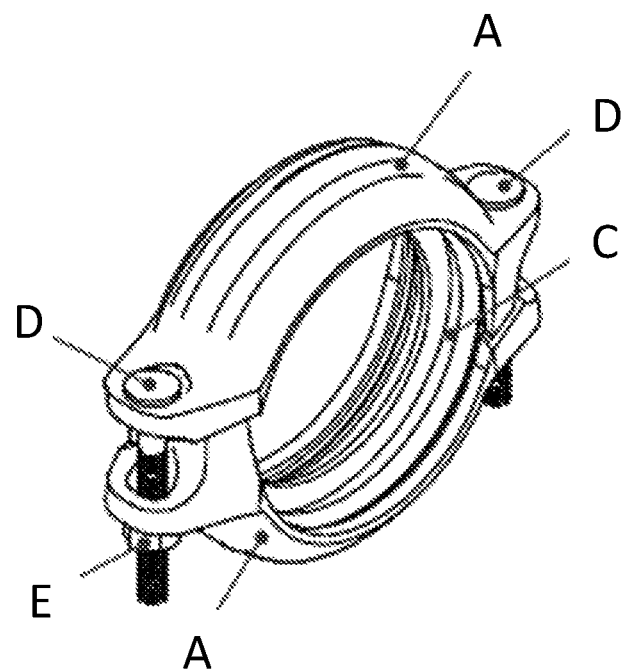
FIGS. 4a and 4b show perspective and cross-sectional views of the tightened state.
Figure 4B:
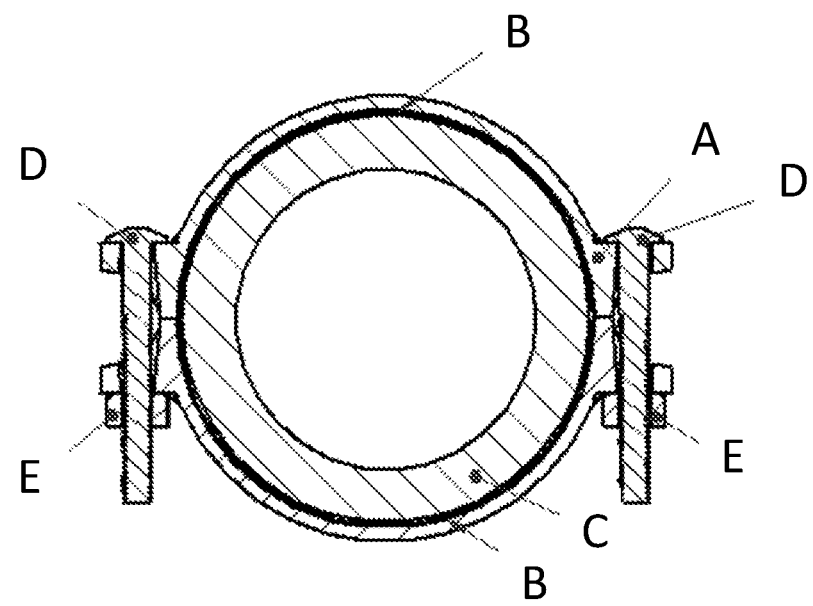

In FIG. 4a-b it is shown that the nuts E are tightened on their bolts D to a position in which the lugs 12 have almost or entirely come to lie against each other. This is defined as the installed state for the housing segments A and supporting barrier ring B. In this installed state the opposing ones of the engaging shoulders 11 delimit sideways open insertion openings 25 that are smaller than cross-sectional dimensions of the outer cylindrical surfaces of pipe ends that are aimed to be inserted into and connected together with the coupling, such that the engaging shoulders can grip radially into circumferential grooves that are present inside the outer cylindrical surfaces of such pipe ends.

The supporting barrier ring B then no longer has its overlapping end portions 15 temporarily locked together by means of the locking means. In this unlocked state, the supporting barrier ring B has been given freedom to vary its inner radius Rbi depending on the amount of overlap between its end portions 15. In the installed state of the supporting barrier ring B as shown in FIGS. 4 and 5 this means that the male portion 17, here the pin, has slid in the circumferential direction through the female portion 16, here the slit, and that the inner radius Rbi of the supporting barrier ring B has become substantially the same as the radius Rco of the outer surface of the gasket C. Furthermore, the supporting barrier ring B then has become an outer radius Rbo that is substantially the same as the inner radii Rai of the bottom walls of the deepest middle portion 10' of the semi-circular channels inside the housing segments A.

See also FIG. 6b where a situation is shown in which the two pipe-ends that were inserted from opposing sides into the pre-assembled coupling, are now firmly gripped and sealed by the tightened coupling. Due to the tightening, the initial lock of the supporting barrier ring B is set free, giving the housing segments A the freedom to move towards each other, while deforming the inwardly projecting lips of the gasket C towards a tighter seal against the pipe ends, and while the engaging shoulders 11 of the housing segments A get to firmly grip into circumferential grooves that are present in each of the two inserted pipe ends.

With this the supporting barrier ring B also bridges any left spacing between the opposing free ends of the housing segments A and thus prevents the gasket C from starting to gradually extrude outwards at those transition locations.

In FIGS. 7a and 7b the supporting barrier ring B and in particular the end portions 15 and the locking means 30 provided thereupon are shown in more detail. The locking means 30 here are combined with the complementary female-male portions 16, 17. There it can be seen that the female portion 16, here the slit, comprises a narrowing 31 at a transition of a docking portion 16' and a sliding portion 16" of the female portion 16, here the slit. This narrowing 31 is slightly smaller than the cross-sectional dimensions of the male portion 17, here the pin. In order for the male portion 17, here the pin, to move out of the docking portion 16' into the sliding portion 16", it needs to pass the narrowing 31, for which a certain threshold force is required that is able to push or deform pointed ring parts, that project inwardly into the slit, out of the way.

In FIG. 7a the initially temporarily locked state is shown in which the supporting barrier ring B has its 'fixedly locked' radius Rb that is a few millimetres larger than the radius Rco of an outer surface of the gasket C and that is a few millimetres larger than the inner radii Rai of the deepest middle portion 10' of the semi-circular channels 10 inside the housing segments A.

In FIG. 7b a situation is shown in which the end portions 15 are not yet overlapping such that the female and male portions 16, 17 can more easily be distinguished from each other.

In FIGS. 8a and 8b largely a same supporting barrier ring B is shown as in FIG. 7. Besides the provision of the locking means 30 combined with the complementary female-male portions 16, 17 and the narrowing 30 at the transition of the docking portion 16' and sliding portion 16" of the female portion 16, now also a guiding shoe 40 is provided. Like the male pin portion 17, the guiding shoe 40 is provided as a male portion on the radially inner one 15" of the end portions 15. The guiding shoe 40 is provided spaced from the pin portion 17 closer to the free outer end of the inner end portion 15".

The guiding shoe 40 has a width that is substantially the same as a width of the female slit sliding portion 16". Furthermore the guiding shoe 40 has an elongate shape in the circumferential direction of the supporting barrier ring B, and extends in the radial direction while projecting with a sliding fit through the female slit sliding portion 16". Both the male pin portion 17 and the male guiding shoe are thus movably guided in the circumferential direction along the female slit sliding portion 16", as soon as the pin portion 17 has been force to pass the narrowing 31. Together this offers an improved sideways stability to the overlapping end portions 15 of the supporting barrier ring B.

Figure 9A:
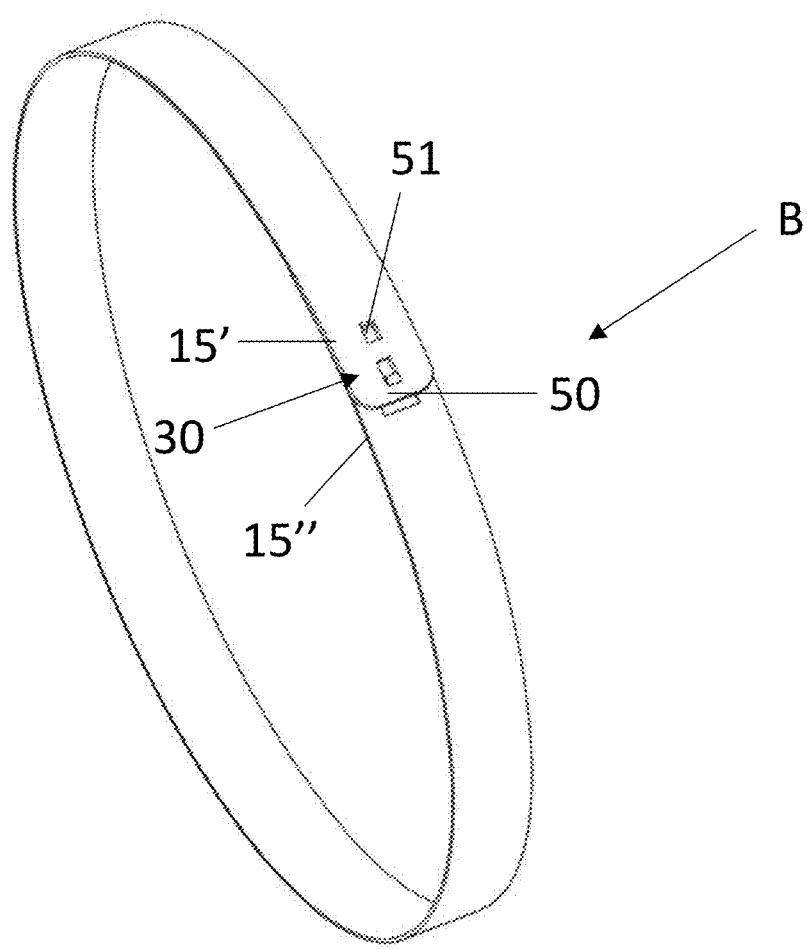
FIG. 9a shows a third variant of the supporting barrier ring with hook-type locking means, in an initially locked position in its pre-assembled ready for installation state.
Figure 9B:
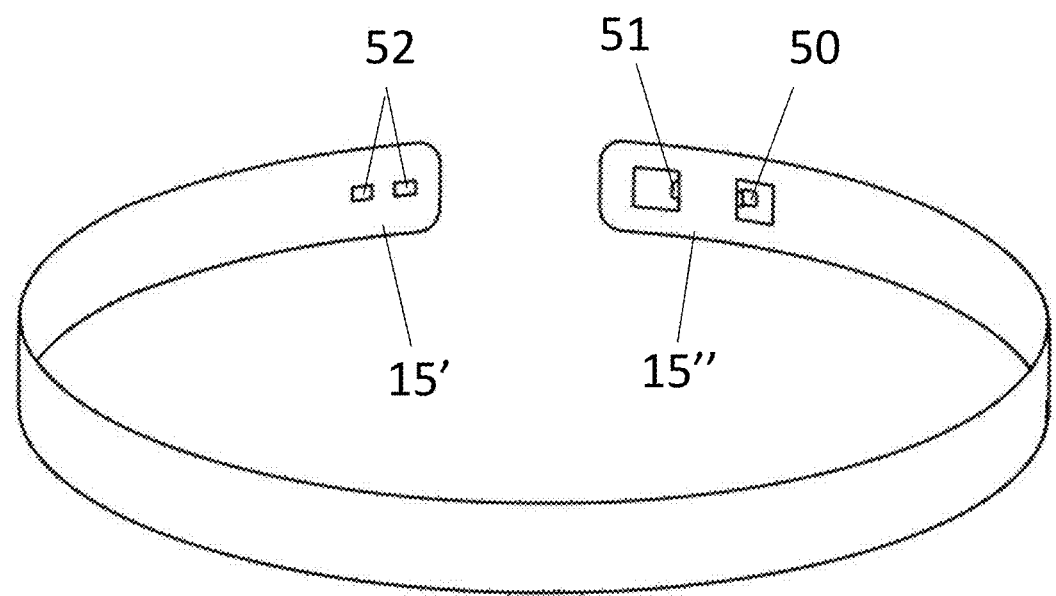
FIG. 9b shows an enlarged partial view of FIG. 9a showing the end portions in an open position before pre-assembly.

In FIGS. 9a and 9b another embodiment of the supporting barrier ring B is shown. The locking means 30 are again formed by complementary female-male portions configured to grip into each other and temporarily lock the supporting barrier ring B in its pre-assembled ready for installation state, in which it is 'fixedly locked' at the previously mentioned radius Rb that is a few millimetres larger than the radius Rco of an outer surface of the gasket C and that is a few millimetres larger than the inner radii Rai of the deepest middle portion 10' of the semi-circular channels 10 inside the housing segments A.

The locking means 30 here comprise a male hook portion 50 and a spaced apart male abutment portion 51 that are provided on the end portion 15", and that are configured to project through and hook into a complementary set of spaced apart female insertion openings 52 that are provided on the end portion 15'. The abutment portion 51 is provided to prevent that the supporting barrier ring B accidentally prematurely unlocks. It only allows the backwards directed male hook portion 50 to slide tangentially forward in its opening 52 and then move radially inward out of its opening 52 while unlocking the supporting barrier ring B, until after the abutment portion 51 has first been pushed radially inwards out of its opening 52, in particular due to the housing segments A starting to move towards each other upon tightening. The advantage hereof is that the unlocking more gets to be more of a gradual and automatic result of the fact that the housing segments A get forced to move towards each other upon tightening of the bolts, without this unlocking process of the supporting barrier ring B requiring too much additional tensioning force.

In FIGS. 10a and 10b yet another embodiment of the supporting barrier ring B is shown. The locking means 30 again are formed by complementary female-male portions configured to grip into each other and temporarily lock the supporting barrier ring B in its pre-assembled ready for installation state, in which it is 'fixedly locked' at the previously mentioned radius Rb that is a few millimetres larger than the radius Rco of an outer surface of the gasket C and that is a few millimetres larger than the inner radii Rai of the deepest middle portion 10' of the semi-circular channels 10 inside the housing segments A.

The locking means 30 here comprise a female insertion opening 60 that is provided in the end portion 15', and that is configured to insert a male tongue portion 61 into and to, upon decreasing of the ring's radius, guide the male tongue portion 61 to slide progressively further through the female insertion opening 60 in the circumferential direction. The female insertion opening, here a slit, extends over a large part of width of the end portion 15'. For ease of initial insertion, the male tongue portion 61 has an arrow-shaped head 61'. In order to prevent the arrow-shaped head 61' to be accidentally pulled out again, it has an innermost part that is slightly wider than the width of the female insertion opening 60 in the cross-section direction.

Directly behind the arrow-shaped head 61', a narrowing 62 is provided that is slightly narrower than the width of the female insertion opening 60. Directly behind the narrowing 62, a sideways projecting collar 61" is provided that is slightly wider than the width of the female insertion opening 60. The narrowing 62 forms a docking part on the tongue portion 61. Behind the collar 61", the tongue portion comprises an elongate sliding part 61'" that is slightly narrower than the width of the female insertion opening 60. In order for the sliding part 61'" to start sliding through the female insertion opening 60, the tongue's docking part needs to pass the female insertion opening 60, for which a certain threshold force is required that is able to push or deform the collar 61" out of the way. The advantage hereof is that a sideways stably guided supporting barrier ring B is obtained that is economic and easy to cut out of band material, while at a same time being able to provide a reliable docking position.

In FIG. 11 a supporting barrier ring B is shown that comprises a plurality of spiral spring windings 70 lying adjacent each other. The spiral spring windings 70 are configured to together temporarily keep the supporting barrier ring B in its pre-assembled ready for installation state, in which it has the previously mentioned radius Rb that is a few millimetres larger than the radius Rco of an outer surface of the gasket C and that is a few millimetres larger than the inner radii Rai of the deepest middle portion 10' of the semi-circular channels 10 inside the housing segments A. In particular a radially outwardly directed biassing force then is present inside the spring windings 70 that is well able to counter the initial tensioning forces of the connection members D, E on the housing segments A.

When subsequently, during a final stage of installation, the connection members D, E are tightened while forcing the housing segments to move towards each other until their engaging shoulders have fully engaged the pipe ends, the spiral spring windings 70 are well able to increase their overlaps and thus decrease all radii of the windings 70. With this the radially outwardly directed biassing forces of the spring windings 70 shall increase.

During this final stage of installation, the windings 70 of the supporting barrier ring B together form a protective barrier against the gasket C getting damaged or extruding outwards at transitions between the housing segments A. Also it is well able to prevent that gasket material gets pinched in between lugs or the like of the housing segments A or gets cut open by rotating threads of the connection members D, E during tightening.

In FIG. 12 largely a same supporting barrier ring B is shown as in FIG. 11. This time it comprises merely two overlapping spiral windings 70 lying adjacent of each other. Furthermore, the outer ends of the spiral windings 70 are bent sideways and backwards in such a way that they form rounded outer ends 80. This helps to prevent that those outer ends 80 may get jammed inside the housing segments A or may start to pinch into the gasket C, when the windings 70 are forced to further slide along each other and move towards smaller radii.

Figure 13:
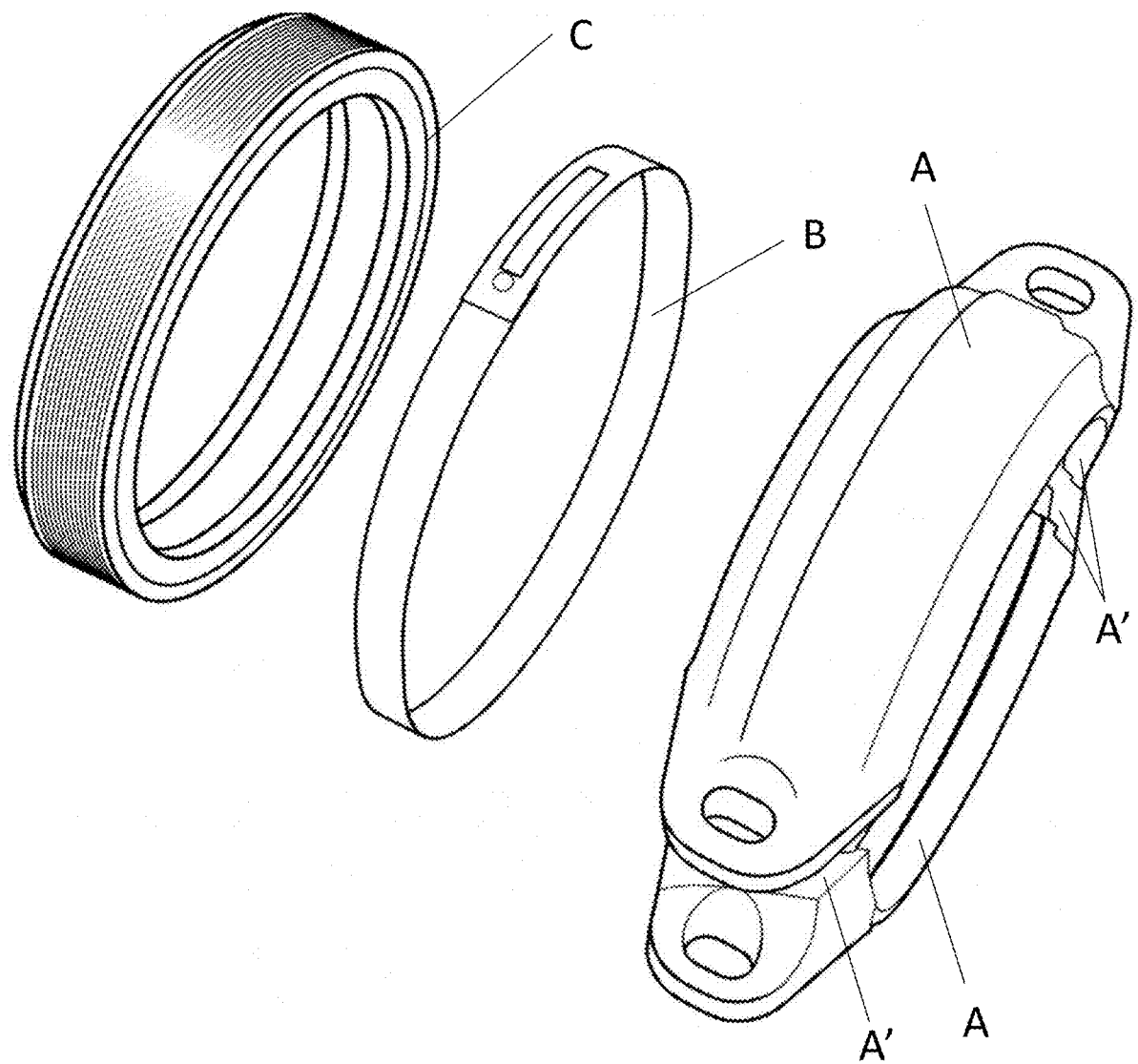
FIG. 13 shows an exploded view of a variant embodiment.
Figure 14A:
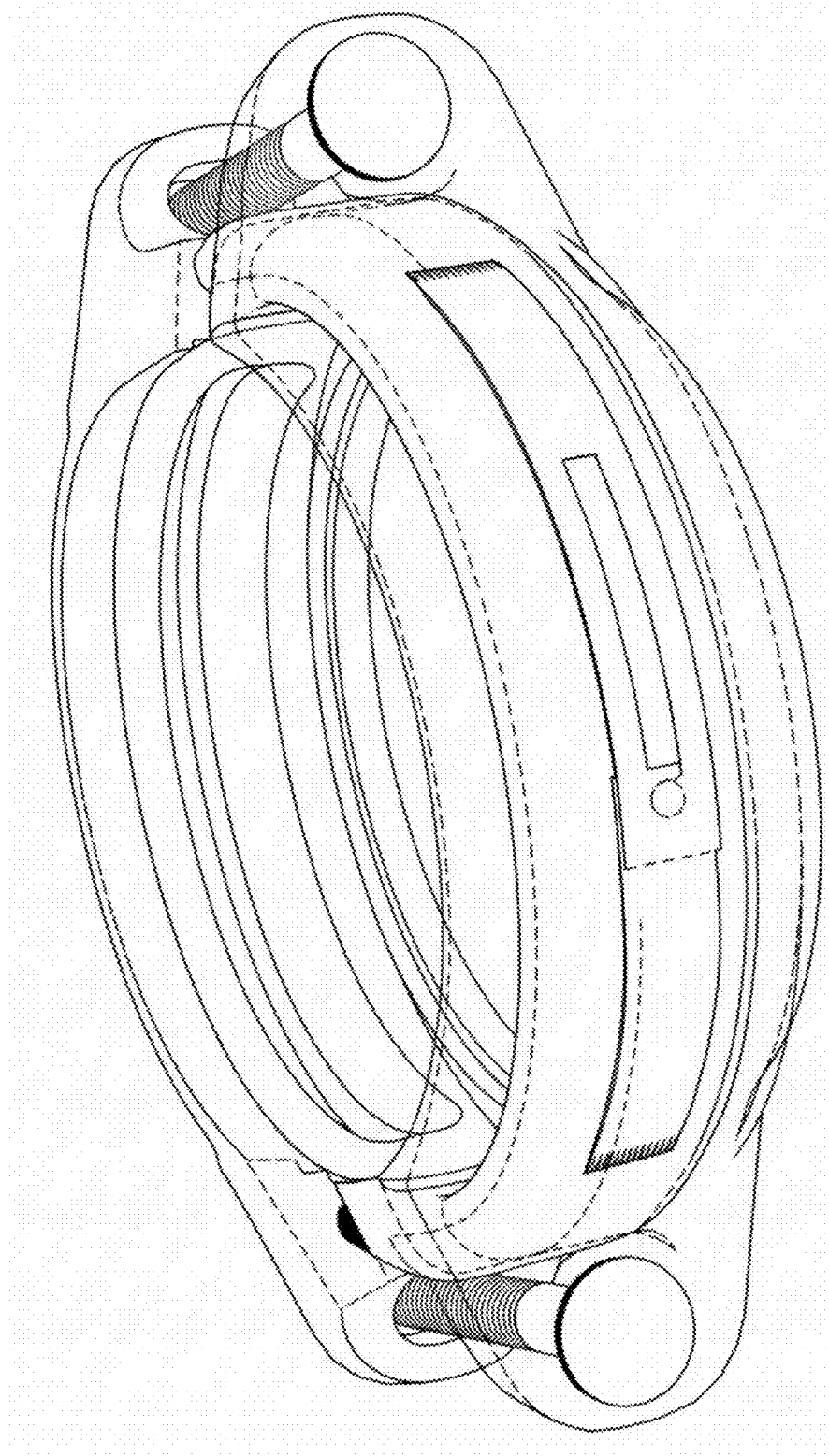
FIG. 14a-b show a perspective and cross-sectional view of the variant embodiment of FIG. 13 in the pre-assembled ready for installation state.
Figure 14B:
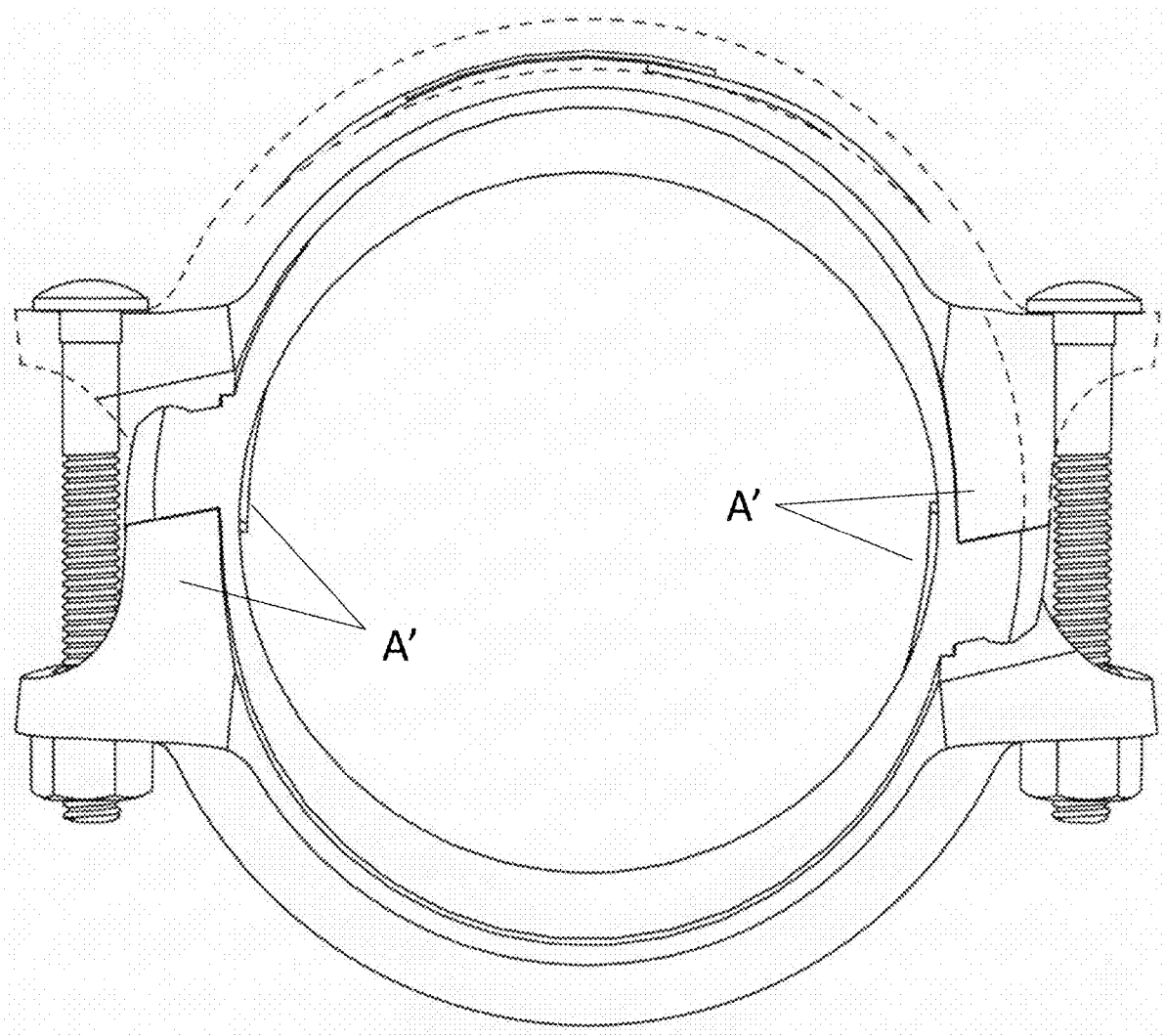
Figure 15A:
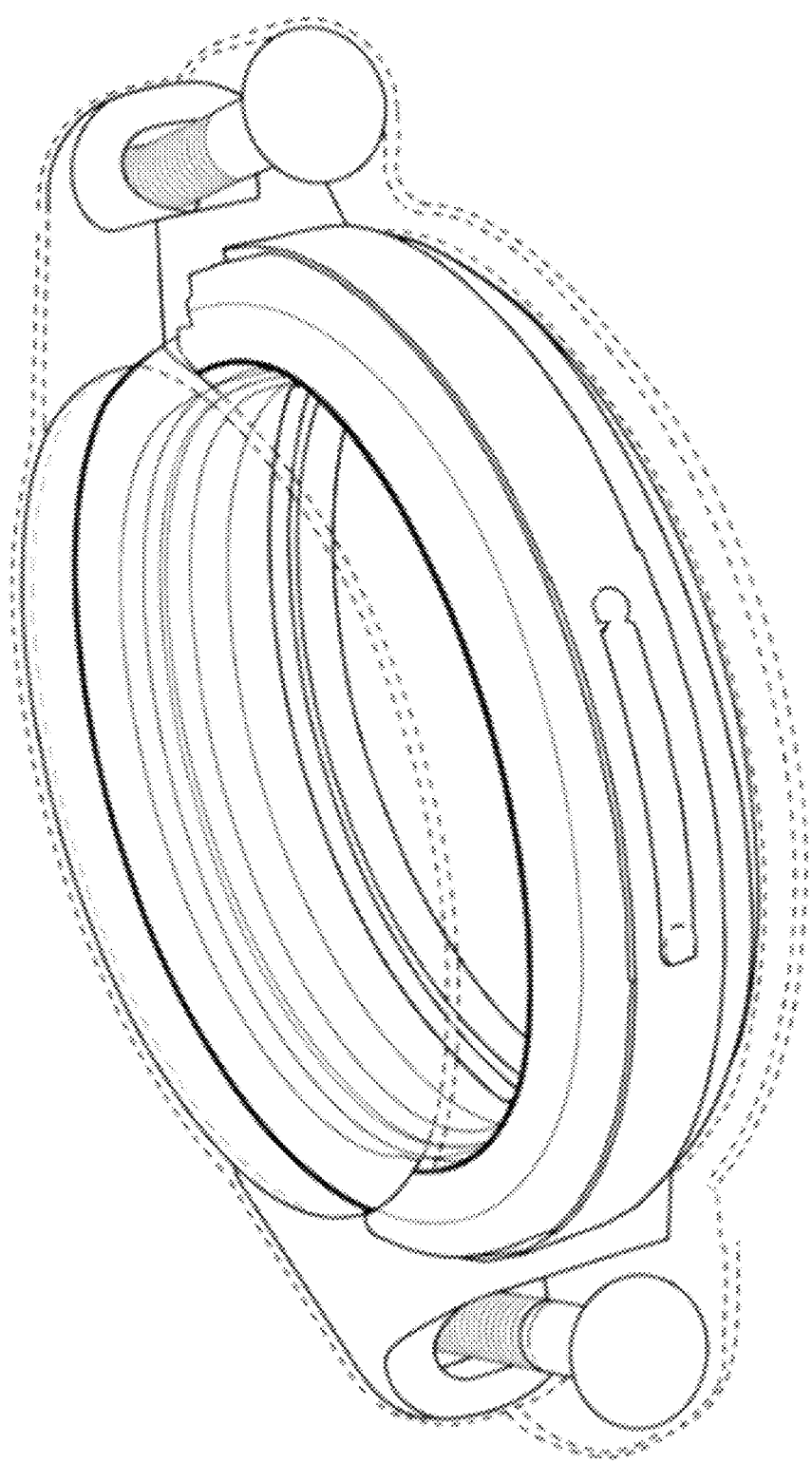
FIG. 15a-b show FIG. 14a-b in a tightened state.
Figure 15B:
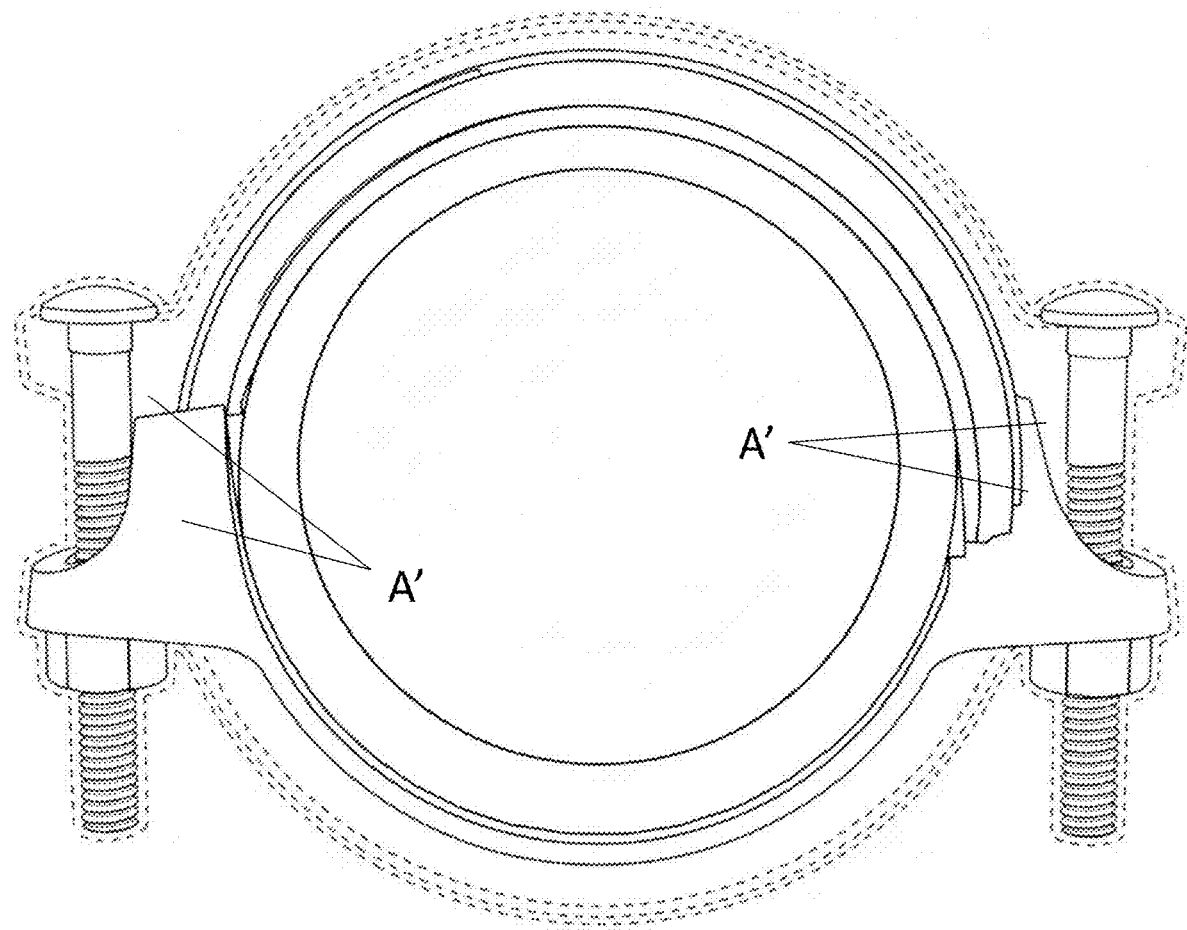

In FIG. 13-15 a variant is shown in which the housing segments A are equipped at their free ends with tongues A' that together with the supporting barrier ring B further may help to prevent a possibility of pinching of the gasket C to occur during the installation.

Besides the shown and described embodiments, numerous variants are possible. For example the dimensions and shapes of the various parts can be altered. Also it is possible to make combinations between advantageous aspects of the shown embodiments. Instead of using bolts-nuts, other kinds of connection members can be used. The invention no longer makes it necessary to have the housing segments provided at both sets of opposing free ends with bolt lugs and tightenable connection members, but makes it possible to for example use a hinge at one set of opposing free ends instead.

All kinds of materials can be used for the housing segments and the supporting barrier ring, including plastic. Preferably however they are made of metal. Instead of using the pin-slit connection, the hook connection, or the tongue-mouth connection, between the end portions of the split supporting barrier ring, it is also possible to use other types of temporary automatically unlocking locking means. The locking means may for example be formed by an adhesive connection of a certain threshold strength between the overlapping end portions, or by a breakable/tearable and/or weakened connection between the overlapping end portions.

Instead of two semi-circular housing segments that each extend over an angle of substantially 180 degrees, it is also possible to use a larger number of arcuate housing segments that each extend over smaller angles.

It should be understood that various changes and modifications to the presently preferred embodiments can be made without departing from the scope of the invention, and therefore will be apparent to those skilled in the art. It is therefore intended that such changes and modifications be covered by the appended claims.

The invention claimed is:

1. A quick installation pipe coupling configured for connecting pipe ends, comprising:
   a plurality of housing segments, each housing segment comprising radially inwardly projecting arcuate engaging shoulders that are configured for engaging pipe ends;
   one or more tightenable connection members for connecting the housing segments with each other while surrounding a central space for insertion of said pipe ends; and
   a gasket that is received into an annular channel that is defined by the housing segments in between the arcuate engaging shoulders and that is configured to engage sealing on said pipe ends upon tightening of the one or more connection members,
   wherein the coupling further comprises a supporting barrier ring that is located between the gasket and a bottom wall of the annular channel that is defined by the housing segments in between the arcuate engaging shoulders,
   wherein the supporting barrier ring extends as a protective barrier circumferentially around an outer surface of the gasket, and
   wherein the supporting barrier ring is dimensioned and configured to support the housing segments spaced-apart in a pre-assembled ready for installation state with their arcuate engaging shoulders delimiting insertion openings towards the central space that are larger than cross-sectional dimensions of said pipe ends before tightening of the one or more connection members.

2. The pipe coupling according to claim 1, wherein the supporting barrier ring has a split and has circumferentially overlapping end portions in the pre-assembled ready for installation state that are configured to increase their overlap upon tightening of the one or more connection members.

3. The pipe coupling according to claim 2, wherein complementary male and female parts are provided on the respective overlapping end portions of the supporting barrier ring, wherein the female part extends in the circumferential direction along its respective overlapping end portion, and wherein the male part is movably guided in the circumferential direction along the female part.

4. The pipe coupling according to claim 3, wherein the female part is a slit or groove and the male part is a pin that projects into or through the slit or groove, wherein the slit or groove comprises a narrowing that is configured to form the temporary locking connection by only letting the pin pass by the narrowing towards a sliding section of the slit when the tightening of the one or more connection members reduces the spacing between the housing segments and forces the end portions of the supporting barrier ring to increase the end portions overlap.

5. The pipe coupling according to claim 2, wherein the overlapping end portions of the supporting barrier ring are provided with a temporary locking connection that is configured for temporary connecting and locking the supporting barrier ring in the pre-assembled ready for installation state.

6. The pipe coupling according to claim 5, wherein the temporary locking connection is configured to automatically unlock when a tightening of the one or more connection members reduces a spacing between the housing segments and forces the end portions of the supporting barrier ring to increase their overlap.

7. The pipe coupling according to claim 1, wherein the supporting barrier ring extends freely with a play around the gasket in the pre-assembled ready for installation state.

8. The pipe coupling according to claim 1, wherein an outer surface of the gasket has a smaller diameter than an inner surface of the supporting barrier ring in the pre-assembled ready for installation state.

9. The pipe coupling according to claim 1, wherein the supporting barrier ring comprises a metal material.

10. The pipe coupling according to claim 1, wherein the supporting barrier ring comprises a plastic material.

11. The pipe coupling according to claim 1, wherein the supporting barrier ring comprises a strip of sheet material.

12. The pipe coupling according to claim 1, wherein the supporting barrier ring has a width that is smaller than a width of the gasket.

13. The pipe coupling according to claim 1, wherein the supporting barrier ring has a width that is equal to or larger than a width of the gasket.

14. A method for quick installing a quick installation pipe coupling comprising:
utilizing the quick installation pipe coupling according to claim 1.

\* \* \* \* \*